United States Patent
Jiang et al.

(10) Patent No.: US 8,199,119 B2
(45) Date of Patent: Jun. 12, 2012

(54) TOUCH PANEL AND DISPLAY DEVICE USING THE SAME

(75) Inventors: Kai-Li Jiang, Beijing (CN); Liang Liu, Beijing (CN); Shou-Shan Fan, Beijing (CN)

(73) Assignees: Beijing FUNATE Innovation Technology Co., Ltd., Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 819 days.

(21) Appl. No.: 12/286,227

(22) Filed: Sep. 29, 2008

(65) Prior Publication Data

US 2009/0153515 A1 Jun. 18, 2009

(30) Foreign Application Priority Data

Dec. 12, 2007 (CN) .......................... 2007 1 0125106

(51) Int. Cl.
*G09G 5/00* (2006.01)

(52) U.S. Cl. ....................................................... 345/173

(58) Field of Classification Search .................. 345/173, 345/174; 438/408, 1.3, 1.4; 359/489.2; 313/495
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |
| 7,060,241 B2 | 6/2006 | Glatkowski | |
| 7,084,933 B2 | 8/2006 | Oh et al. | |
| 7,194,912 B2 * | 3/2007 | Jordan et al. .................... | 73/774 |
| 7,196,463 B2 * | 3/2007 | Okai et al. .................... | 313/495 |
| 7,215,329 B2 | 5/2007 | Yoshikawa et al. | |

(Continued)

FOREIGN PATENT DOCUMENTS

CN 2539375 3/2003

(Continued)

OTHER PUBLICATIONS

Kai-Li Jiang, Qun-Qing Li, Shou-Shan Fan, "Continuous carbon nanotube yarns and their applications", Physics, China, pp. 506-510, Aug. 31, 2003,32(8)(lines from the 4th line to 35th line in the right column of p. 507 may be relevant).

(Continued)

*Primary Examiner* — Nabil Hindi
(74) *Attorney, Agent, or Firm* — Altis Law Group, Inc.

(57) ABSTRACT

A touch panel includes a substrate, a transparent conductive layer, and at least two electrodes. The transparent conductive layer is formed on a surface of the substrate. The transparent conductive layer includes a carbon nanotube layer, and the carbon nanotube layer includes a plurality of carbon nanotubes arranged along a same direction. The electrodes are electrically connected with the transparent conductive layer. Further, a display device using the touch panel is also included.

17 Claims, 5 Drawing Sheets

U.S. PATENT DOCUMENTS

| | | | |
|---|---|---|---|
| 7,242,136 B2 | 7/2007 | Kim et al. | |
| 7,336,261 B2 | 2/2008 | Yu | |
| 7,348,966 B2 | 3/2008 | Hong et al. | |
| 7,397,466 B2* | 7/2008 | Bourdelais et al. | 345/173 |
| 7,532,182 B2 | 5/2009 | Tseng et al. | |
| 7,593,004 B2* | 9/2009 | Spath et al. | 345/174 |
| 7,630,040 B2 | 12/2009 | Liu et al. | |
| 7,645,497 B2* | 1/2010 | Spath et al. | 428/1.4 |
| 7,662,732 B2* | 2/2010 | Choi et al. | 438/800 |
| 7,663,607 B2 | 2/2010 | Hotelling et al. | |
| 7,704,480 B2 | 4/2010 | Jiang et al. | |
| 7,710,649 B2* | 5/2010 | Feng et al. | 359/489.2 |
| 7,796,123 B1* | 9/2010 | Irvin et al. | 345/173 |
| 7,825,911 B2 | 11/2010 | Sano et al. | |
| 7,854,992 B2* | 12/2010 | Fu et al. | 428/408 |
| 7,947,977 B2 | 5/2011 | Jiang et al. | |
| 7,956,287 B2* | 6/2011 | Takayama et al. | 174/94 R |
| 2002/0089492 A1 | 7/2002 | Ahn et al. | |
| 2003/0122800 A1 | 7/2003 | Yu | |
| 2003/0147041 A1 | 8/2003 | Oh et al. | |
| 2004/0047038 A1 | 3/2004 | Jiang et al. | |
| 2004/0053780 A1 | 3/2004 | Jiang et al. | |
| 2004/0099438 A1 | 5/2004 | Arthur et al. | |
| 2004/0105040 A1 | 6/2004 | Oh et al. | |
| 2004/0136896 A1 | 7/2004 | Liu et al. | |
| 2004/0191157 A1 | 9/2004 | Harutyunyan et al. | |
| 2004/0251504 A1 | 12/2004 | Noda | |
| 2005/0110720 A1 | 5/2005 | Akimoto et al. | |
| 2005/0151195 A1 | 7/2005 | Kavase et al. | |
| 2005/0209392 A1 | 9/2005 | Luo et al. | |
| 2006/0010996 A1 | 1/2006 | Jordan et al. | |
| 2006/0022221 A1 | 2/2006 | Furukawa et al. | |
| 2006/0044284 A1 | 3/2006 | Tanabe | |
| 2006/0077147 A1 | 4/2006 | Palmateer et al. | |
| 2006/0097991 A1 | 5/2006 | Hotelling et al. | |
| 2006/0171032 A1 | 8/2006 | Nishioka | |
| 2006/0187213 A1 | 8/2006 | Su | |
| 2006/0188721 A1 | 8/2006 | Irvin, Jr. et al. | |
| 2006/0213251 A1 | 9/2006 | Rinzler et al. | |
| 2006/0240605 A1 | 10/2006 | Moon et al. | |
| 2006/0262055 A1 | 11/2006 | Takahara | |
| 2006/0263588 A1 | 11/2006 | Handa et al. | |
| 2006/0274047 A1 | 12/2006 | Spath et al. | |
| 2006/0274048 A1 | 12/2006 | Spath et al. | |
| 2006/0274049 A1 | 12/2006 | Spath et al. | |
| 2006/0275956 A1 | 12/2006 | Konesky | |
| 2006/0278444 A1 | 12/2006 | Binstead | |
| 2007/0065651 A1 | 3/2007 | Glatkowski et al. | |
| 2007/0075619 A1 | 4/2007 | Jiang et al. | |
| 2007/0081681 A1 | 4/2007 | Yu et al. | |
| 2007/0099333 A1 | 5/2007 | Moriya | |
| 2007/0165004 A1 | 7/2007 | Seelhammer et al. | |
| 2007/0182720 A1 | 8/2007 | Fujii et al. | |
| 2007/0215841 A1 | 9/2007 | Ford et al. | |
| 2007/0257894 A1 | 11/2007 | Philipp | |
| 2007/0262687 A1 | 11/2007 | Li | |
| 2007/0279556 A1 | 12/2007 | Wang et al. | |
| 2007/0296897 A1 | 12/2007 | Liu et al. | |
| 2007/0298253 A1 | 12/2007 | Hata et al. | |
| 2008/0029292 A1 | 2/2008 | Takayama et al. | |
| 2008/0088219 A1 | 4/2008 | Yoon et al. | |
| 2008/0129666 A1 | 6/2008 | Shimotono et al. | |
| 2008/0138589 A1 | 6/2008 | Wakabayashi et al. | |
| 2008/0192014 A1* | 8/2008 | Kent et al. | 345/173 |
| 2008/0238882 A1 | 10/2008 | Sivarajan et al. | |
| 2008/0266273 A1 | 10/2008 | Slobodin et al. | |
| 2009/0032777 A1 | 2/2009 | Kitano et al. | |
| 2009/0056854 A1 | 3/2009 | Oh et al. | |
| 2009/0059151 A1 | 3/2009 | Kim et al. | |
| 2009/0101488 A1 | 4/2009 | Jiang et al. | |
| 2009/0153511 A1 | 6/2009 | Jiang et al. | |
| 2009/0208708 A1 | 8/2009 | Wei et al. | |
| 2009/0283211 A1 | 11/2009 | Matsuhira | |
| 2009/0293631 A1 | 12/2009 | Radivojevic | |
| 2010/0001972 A1 | 1/2010 | Jiang et al. | |
| 2010/0001976 A1 | 1/2010 | Jiang et al. | |
| 2010/0007619 A1 | 1/2010 | Jiang et al. | |
| 2010/0007624 A1 | 1/2010 | Jiang et al. | |
| 2010/0007625 A1 | 1/2010 | Jiang et al. | |
| 2010/0065788 A1 | 3/2010 | Momose et al. | |
| 2010/0078067 A1 | 4/2010 | Jia et al. | |
| 2010/0093247 A1 | 4/2010 | Jiang et al. | |
| 2010/0171099 A1 | 7/2010 | Tombler, Jr. et al. | |
| 2010/0271330 A1 | 10/2010 | Philipp | |
| 2011/0032196 A1 | 2/2011 | Feng et al. | |

FOREIGN PATENT DOCUMENTS

| | | |
|---|---|---|
| CN | 1447279 | 10/2003 |
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| DE | 202007006407 | 9/2007 |
| EP | 1739692 | 1/2007 |
| JP | S61-231626 | 10/1986 |
| JP | S62-63332 | 3/1987 |
| JP | S62-182916 | 8/1987 |
| JP | S62-190524 | 8/1987 |
| JP | H2-8926 | 1/1990 |
| JP | 1991-54624 | 3/1991 |
| JP | H3-54624 | 3/1991 |
| JP | 5-53715 | 3/1993 |
| JP | H06-28090 | 2/1994 |
| JP | H6-67788 | 3/1994 |
| JP | 8-287775 | 11/1996 |
| JP | H10-63404 | 3/1998 |
| JP | 2001-34419 | 2/2001 |
| JP | 2001-267782 | 9/2001 |
| JP | 2002-278701 | 9/2002 |
| JP | 2003-99192 | 4/2003 |
| JP | 2003-99193 | 4/2003 |
| JP | 2003-288164 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2007-11997 | 1/2007 |

| | | |
|---|---|---|
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-229989 | 9/2007 |
| JP | 2007-299409 | 11/2007 |
| JP | 2007-310869 | 11/2007 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 242732 | 9/2004 |
| TW | 200518195 | 6/2005 |
| TW | I233570 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | 200722559 | 6/2007 |
| TW | 284927 | 8/2007 |
| TW | 200729241 | 8/2007 |
| TW | 200737414 | 10/2007 |
| TW | 200738558 | 10/2007 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |

OTHER PUBLICATIONS

Yu Xiang, Technique of Touch Panel & the Production of Resistance-type Touch Panel Insulation Dot, Journal of Longyan Teachers College, p. 25-26, vol. 22, No. 6, 2004.
Susuki et al."Investigation of physical and electric properties of silver pastes as binder for thermoelectric materials". Review of Scientific Instruments,76,(2005);pp. 023907-1 to 023907-5.
Wu et al."Transparent, Conductive Carbon Nanotube Films". Science,vol. 305,(2004);pp. 1273-1276.
ASM Handbook."Volume 2 Properties and Selection: Nonferrous Alloys and Special-Purpose Materials".Apr. 2007; pp. 840-853.
Fan et al. "Self-Oriented Regular Arrays of Carbon Nanotubes and Their Field Emission Properties". Science, vol. 283, (1999); pp. 512-514.
Mei Zhang etal., "Strong Transparent, Multifunctional, Carbon Nanotube Sheets", Science, America, AAAS, vol. 309, pp. 1215-1219, Aug. 19, 2005.
Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).
George Gruner, "Carbon Nanonets Spark New Electronics", Scientific American, pp. 76-83, May 2007.
Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd paragraph on p. 91 may be relevant).
Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

\* cited by examiner

TOUCH PANEL AND DISPLAY DEVICE USING THE SAME

RELATED APPLICATIONS

This application claims all benefits accruing under 35 U.S.C. §119 from China Patent Application No. 200710125106.4, filed on 2007/12/12 in the China Intellectual Property Office, the disclosure of which is incorporated herein by reference. This application is related to commonly-assigned co-pending applications entitled, "TOUCH PANEL", Ser. No. 12/286,266, filed on Sep. 29, 2008; "TOUCH PANEL", Ser. No. 12/286,141, filed on Sep. 29, 2008; "TOUCH PANEL AND DISPLAY DEVICE USING THE SAME", Ser. No. 12/286,189, filed on Sep. 29, 2008; "TOUCH PANEL AND DISPLAY DEVICE USING THE SAME", Ser. No. 12/286,181, filed on Sep. 29, 2008; "TOUCH PANEL AND DISPLAY DEVICE USING THE SAME", Ser. No. 12/286,176 filed on Sep. 29, 2008; "TOUCH PANEL AND DISPLAY DEVICE USING THE SAME", Ser. No. 12/286,166, filed on Sep. 29, 2008; "TOUCH PANEL AND DISPLAY DEVICE USING THE SAME", Ser. No. 12/286,178, filed on Sep. 29, 2008; "TOUCH PANEL AND DISPLAY DEVICE USING THE SAME", Ser. No. 12/286,148, filed on Sep. 29, 2008; "TOUCHABLE CONTROL DEVICE", Ser. No. 12/286,140, filed on Sep. 29, 2008; "TOUCH PANEL AND DISPLAY DEVICE USING THE SAME", Ser. No. 12/286,154, filed on Sep. 29, 2008; "TOUCH PANEL AND DISPLAY DEVICE USING THE SAME", Ser. No. 12/286,216, filed on Sep. 29, 2008; "TOUCH PANEL AND DISPLAY DEVICE USING THE SAME", Ser. No. 12/286,152, filed on Sep. 29, 2008; "TOUCH PANEL AND DISPLAY DEVICE USING THE SAME", Ser. No. 12/286,145, filed on Sep. 29, 2008; "TOUCH PANEL, METHOD FOR MAKING THE SAME, AND DISPLAY DEVICE ADOPTING THE SAME", Ser. No. 12/286,155, filed on Sep. 29, 2008; "TOUCH PANEL AND DISPLAY DEVICE USING THE SAME", Ser. No. 12/286,179, filed on Sep. 29, 2008; "TOUCH PANEL, METHOD FOR MAKING THE SAME, AND DISPLAY DEVICE ADOPTING THE SAME", Ser. No. 12/286,228, filed on Sep. 29, 2008; "TOUCH PANEL AND DISPLAY DEVICE USING THE SAME", Ser. No. 12/286,153, filed on Sep. 29, 2008; "TOUCH PANEL AND DISPLAY DEVICE USING THE SAME", Ser. No. 12/286,184, filed on Sep. 29, 2008; "METHOD FOR MAKING TOUCH PANEL", Ser. No. 12/286,175, filed on Sep. 29, 2008; "METHOD FOR MAKING TOUCH PANEL", Ser. No. 12/286,195, filed on Sep. 29, 2008; "TOUCH PANEL AND DISPLAY DEVICE USING THE SAME", Ser. No. 12/286,160, filed on Sep. 29, 2008; "TOUCH PANEL AND DISPLAY DEVICE USING THE SAME", Ser. No. 12/286,220, filed on Sep. 29, 2008; "TOUCH PANEL AND DISPLAY DEVICE USING THE SAME", Ser. No. 12/286,146, filed on Sep. 29, 2008; "TOUCH PANEL AND DISPLAY DEVICE USING THE SAME", Ser. No. 12/286,144, filed on Sep. 29, 2008; "TOUCH PANEL AND DISPLAY DEVICE USING THE SAME", Ser. No. 12/286,218, filed on Sep. 29, 2008; "TOUCH PANEL AND DISPLAY DEVICE USING THE SAME", Ser. No. 12/286,142, filed on Sep. 29, 2008; "TOUCH PANEL AND DISPLAY DEVICE USING THE SAME", Ser. No. 12/286,241, filed on Sep. 29, 2008; "TOUCH PANEL, METHOD FOR MAKING THE SAME, AND DISPLAY DEVICE ADOPTING THE SAME", Ser. No. 12/286,151, filed on Sep. 29, 2008; "ELECTRONIC ELEMENT HAVING CARBON NANOTUBES", Ser. No. 12/286,143, filed on Sep. 29, 2008; and "TOUCH PANEL, METHOD FOR MAKING THE SAME, AND DISPLAY DEVICE ADOPTING THE SAME", Ser. No. 12/286,219, filed on Sep. 29, 2008. The disclosures of the above-identified applications are incorporated herein by reference.

BACKGROUND

1. Field of the Invention

The present invention relates to a carbon-nanotube-based touch panel and a display device using the same.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., a display such as a liquid crystal panel). A user of any such electronic apparatus operates it by pressing or touching the touch panel with a finger, a pen, a stylus, or a like tool while visually observing the display device through the touch panel. A demand thus exists for such touch panels that are superior in visibility and reliable in operation.

At present, different types of touch panels, including resistance, capacitance, infrared, and surface sound-wave types, have been developed. The capacitance-type touch panel has several advantages such as high accuracy and excellent transparency, and thus has been widely used.

A conventional capacitance-type touch panel includes a glass substrate, a transparent conductive layer, and four electrodes. The material of the transparent conductive layer is, typically, selected from a group consisting of indium tin oxide (ITO) and antimony tin oxide (ATO). The electrodes are made of metal and separately formed on a surface of the transparent conductive layer. Further, a protective layer is formed on the surface of the transparent conductive layer that faces away from the substrate. The material of the protective layer has insulative and transparent characteristics.

In operation, an upper surface of the touch panel is pressed/touched with a touch tool, such as a user's finger or an electrical pen/stylus. Visual observation of a screen on the liquid crystal display device provided on a backside of the touch panel is possible. In use, because of an electrical field of the user, a coupling capacitance forms between the user and the transparent conductive layer. For high frequency electrical current, the coupled capacitance is a conductor, and thus the touch tool takes away a little current from the touch point. Current flowing through the four electrodes cooperatively replaces the current lost at the touch point. The quantity of current supplied by the four electrodes is directly proportional to the distances from the touch point to the electrodes. A touch panel controller is used to calculate the proportion of the four supplied currents, thereby detecting coordinates of the touch point on the touch panel.

The optically transparent conductive layer (e.g., ITO layer) is generally formed by means of ion-beam sputtering, and this method is relatively complicated. Furthermore, the ITO layer has generally poor mechanical durability, low chemical endurance, and uneven resistance over an entire area of the touch panel. Additionally, the ITO layer has relatively low transparency. All the above-mentioned problems of the ITO layer tend to yield a touch panel with somewhat low sensitivity, accuracy, and brightness.

What is needed, therefore, is to provide a durable touch panel with high sensitivity, accuracy, and brightness, and a display device using the same.

SUMMARY OF THE INVENTION

A touch panel includes a substrate, a transparent conductive layer, and at least two electrodes. The transparent conductive layer is formed on a surface of the substrate. The transparent conductive layer includes a carbon nanotube layer, and the carbon nanotube layer includes a plurality of carbon nanotubes arranged along a same direction. The electrodes are separately located and are electrically connected with the transparent conductive layer. Further, a display device using the touch panel is also included.

Other advantages and novel features of the present touch panel and display device using the same will become more apparent from the following detailed description of the present embodiments, when taken in conjunction with the accompanying drawings.

BRIEF DESCRIPTION OF THE DRAWINGS

Many aspects of the present touch panel and display device using the same can be better understood with reference to the following drawings. The components in the drawings are not necessarily to scale, the emphasis instead being placed upon clearly illustrating the principles of the present touch panel and display device using the same.

Figure 1:
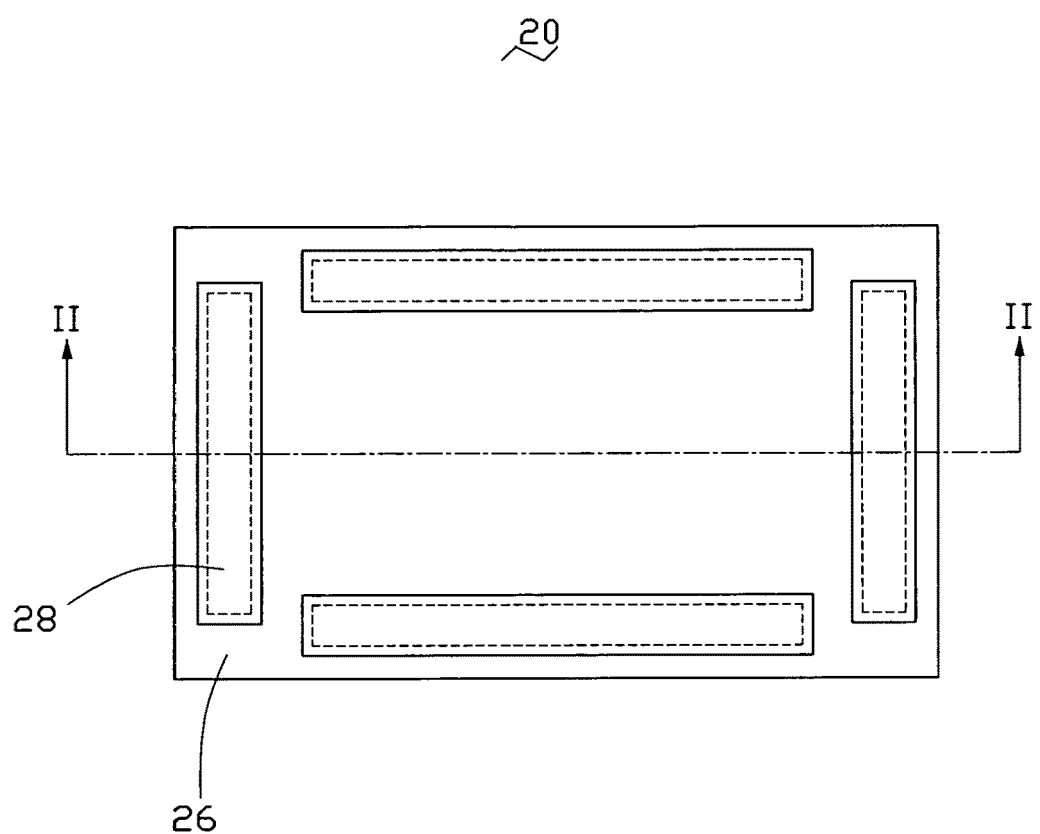
FIG. 1 is a schematic view of a partially assembled touch panel, in accordance with a present embodiment.

Corresponding reference characters indicate corresponding parts throughout the several views. The exemplifications set out herein illustrate at least one embodiment of the present touch panel and display device using the same, in at least one form, and such exemplifications are not to be construed as limiting the scope of the invention in any manner.

DETAILED DESCRIPTION OF EMBODIMENTS

Reference will now be made to the drawings to describe, in detail, embodiments of the present touch panel and display device using the same.

Figure 2:
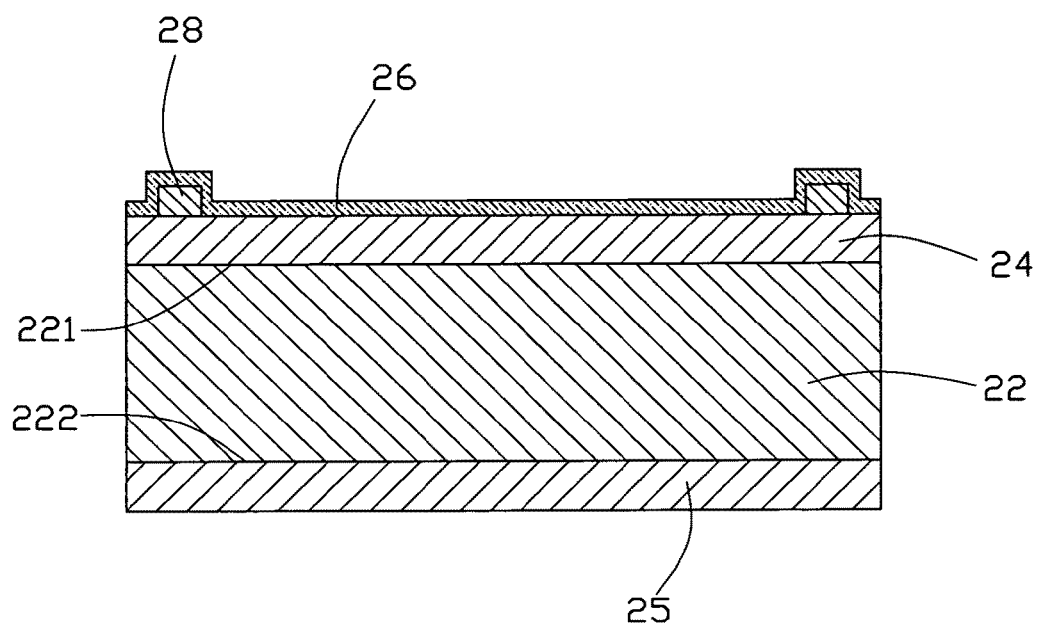
FIG. 2 is a cross-sectional schematic view of the touch panel of the present embodiment, taken along a line II-II of FIG. 1.

Referring to FIG. 1 and FIG. 2, a touch panel 20 includes a substrate 22, a transparent conductive layer 24, a transparent protective layer 26, and at least two electrodes 28. The substrate 22 has a first surface 221 and a second surface 222 at opposite sides thereof respectively. The transparent conductive layer 24 is located on the first surface 221. The electrodes 28 are electrically connected with the transparent conductive layer 24 for forming an equipotential surface on the transparent conductive layer 24. The transparent protective layer 26 covers the electrodes 28 and the exposed surface of the transparent conductive layer 24 that faces away from the substrate 22.

The substrate 22 has a planar structure or a curved structure. The material of the substrate 22 is selected from the group consisting of glass, quartz, diamond, and plastics. The substrate 22 is opportunely made from a transparent material, e.g., either flexible or hard/stiff, depending on whether a flexible device is desired or not. The substrate 22 is used to support the transparent conductive layer 24.

Figure 3:
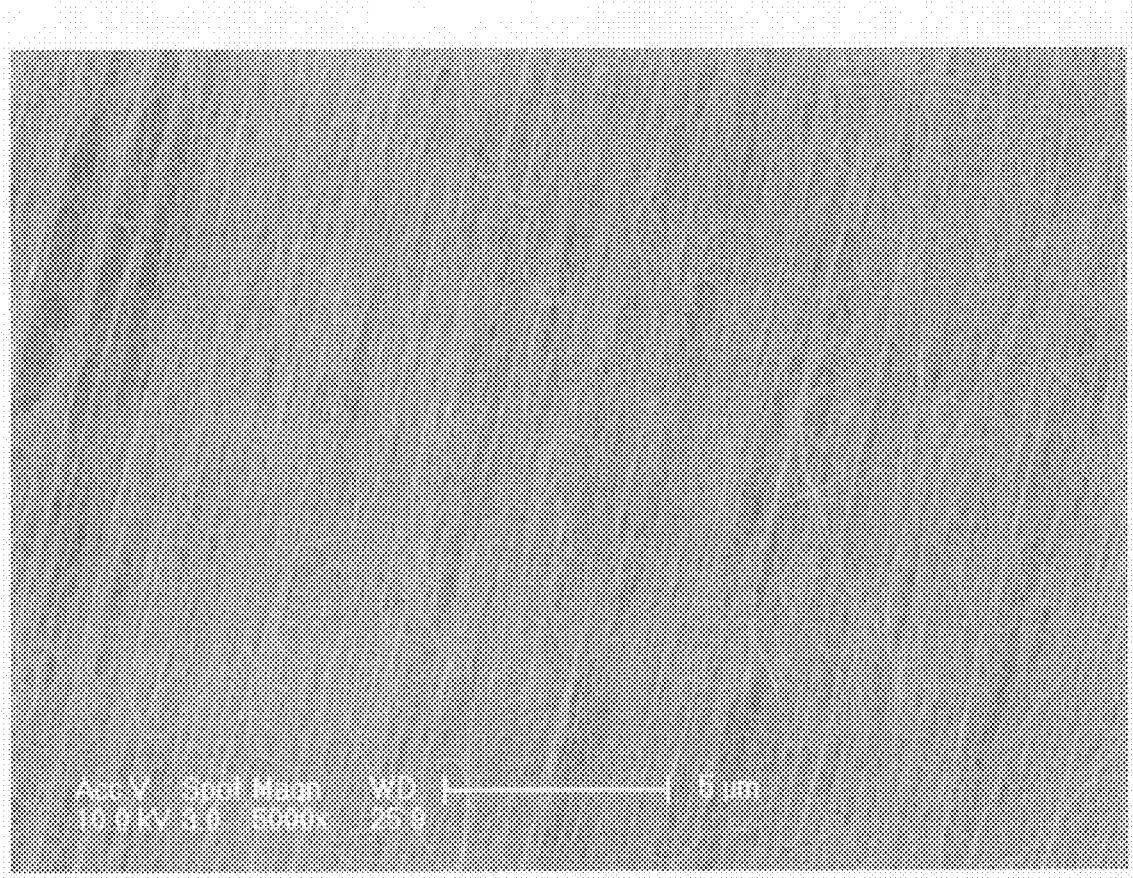
FIG. 3 shows a Scanning Electron Microscope (SEM) image of a carbon nanotube film used in the touch panel of FIG. 1.
Figure 4:
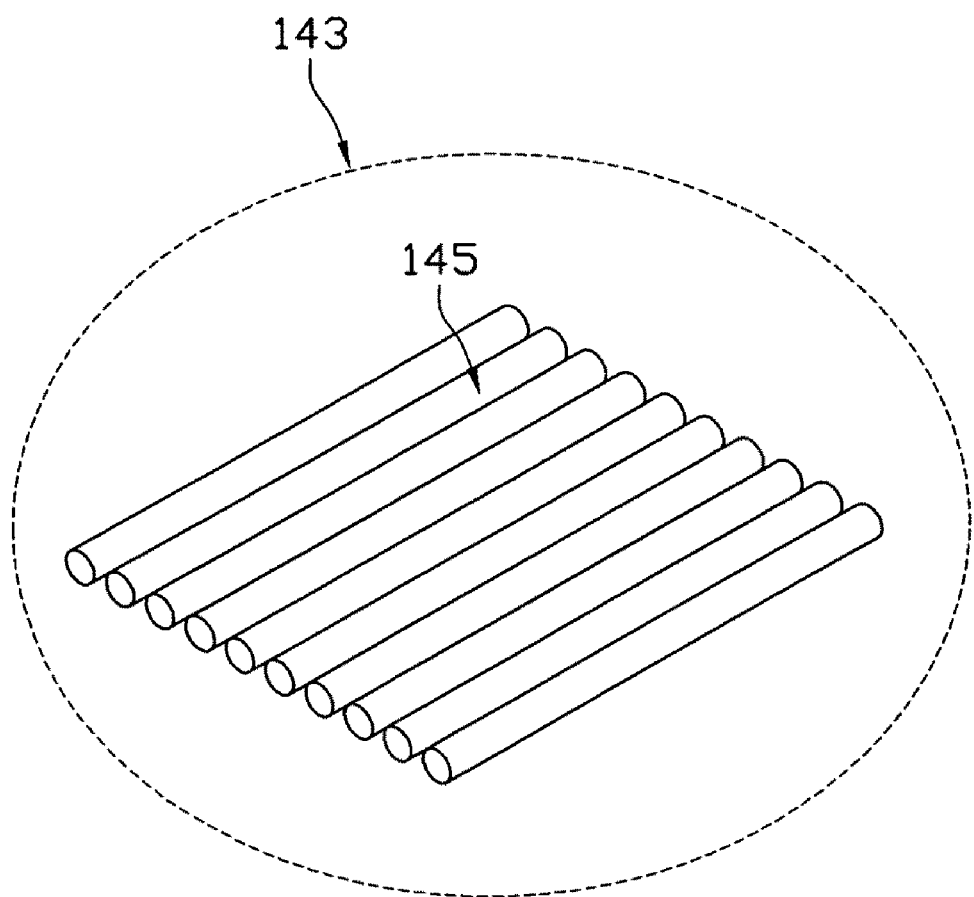
FIG. 4 is a structural schematic of a carbon nanotube segment.

The transparent conductive layer 24 includes a carbon nanotube layer. The carbon nanotube layer contains a plurality of carbon nanotubes, and the carbon nanotubes therein are arranged along a same direction. The carbon nanotube layer can be formed of a single carbon nanotube film or a plurality of coplanar carbon nanotube films. Thus, a length and a width of the carbon nanotube layer can be set, as desired. Referring to FIGS. 3 and 4, each carbon nanotube film comprises a plurality of successively oriented carbon nanotube segments 143 joined end-to-end by van der Waals attractive force therebetween. Each carbon nanotube segment 143 includes a plurality of carbon nanotubes 145 parallel to each other, and combined by van der Waals attractive force therebetween. The carbon nanotube segments 143 can vary in width, thickness, uniformity and shape. The carbon nanotubes 145 in the carbon nanotube film 143 are also oriented along a preferred orientation. In the present embodiment, a thickness of the carbon nanotube film is in an approximate range from 0.5 nanometers to 100 micrometers. The carbon nanotubes in the carbon nanotube film can be selected from a group consisting of single-walled carbon nanotubes, double-walled carbon nanotubes, and multi-walled carbon nanotubes. A diameter of each single-walled carbon nanotube is in an approximate range from 0.5 nanometers to 50 nanometers. A diameter of each double-walled carbon nanotube is in an approximate range from 1 nanometer to 50 nanometers. A diameter of each multi-walled carbon nanotube is in an approximate range from 1.5 nanometers to 50 nanometers. In the following description, unless the context indicates otherwise, it will be assumed that the carbon nanotube layer is formed of a single carbon nanotube film.

A method for fabricating the carbon nanotube film includes the steps of: (a) providing an array of carbon nanotubes, or, providing a super-aligned array of carbon nanotubes; (b) pulling out a carbon nanotube film from the array of carbon nanotubes, by using a tool (e.g., adhesive tape, pliers, tweezers, or another tool allowing multiple carbon nanotubes to be gripped and pulled simultaneously).

In step (a), a given super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in an approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. A 4-inch P-type silicon wafer is used as the substrate in the present embodiment.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters and include a plurality of carbon nanotubes 145 parallel to each other and approximately perpendicular to the substrate. The carbon nanotubes 145 in the array of carbon nanotubes can be multi-walled carbon nanotubes, double-walled carbon nanotubes or single-walled carbon nanotubes. Diameters of the single-walled carbon nanotubes approximately range from 0.5 to 50 nanometers. Diameters of the double-walled carbon nanotubes approximately range from 1 to 50 nanometers. Diameters of the multi-walled carbon nanotubes approximately range from 1.5 to 50 nanometers.

The super-aligned array of carbon nanotubes formed under the above conditions is essentially free of impurities such as carbonaceous or residual catalyst particles. The carbon nanotubes 145 in the super-aligned array are closely packed together by van der Waals attractive force therebetween.

In step (b), the carbon nanotube film can be formed by the substeps of: (b1) selecting one or more carbon nanotubes having a predetermined width from the array of carbon nanotubes; and (b2) pulling the carbon nanotubes to form nanotube segments 143 at an even/uniform speed to achieve a uniform carbon nanotube film.

In step (b1), quite usefully, the carbon nanotube segment 143 includes a plurality of carbon nanotubes 145 parallel to each other. The carbon nanotube segments 143 can be selected by using an adhesive tape as the tool to contact the super-aligned array of carbon nanotubes. In step (b2), the pulling direction is substantially perpendicular to the growing direction of the super-aligned array of carbon nanotubes.

More specifically, during the pulling process, as the initial carbon nanotube segments 143 are drawn out, other carbon nanotube segments 143 are also drawn out end to end due to van der Waals attractive force between ends of adjacent carbon nanotube segments 143. This process of drawing ensures a substantially continuous and uniform carbon nanotube film can be formed.

The carbon nanotube film includes a plurality of carbon nanotube segments 143. The carbon nanotubes 145 in the carbon nanotube film are all substantially parallel to the pulling/drawing direction of the carbon nanotube film, and the carbon nanotube film produced in such manner can be selectively formed having a predetermined width. The carbon nanotube film formed by the pulling/drawing method has superior uniformity of thickness and conductivity over a disordered carbon nanotube film. Further, the pulling/drawing method is simple, fast, and suitable for industrial applications.

In the present embodiment, each carbon nanotube layer includes a single carbon nanotube film. Each carbon nanotube film comprises a plurality of carbon nanotube segments 143 which are in turn comprised of a plurality of carbon nanotubes 145 arranged along a same direction. The direction is generally the pulling direction.

The width of the carbon nanotube film depends on a size of the carbon nanotube array. The length of the carbon nanotube film can be arbitrarily set, as desired. In one useful embodiment, when the substrate is a 4 inch type wafer as in the present embodiment, the width of the carbon nanotube film is in an approximate range from 0.5 nanometers to 10 centimeters, and the thickness of the carbon nanotube film is in the approximate range from 0.5 nanometers to 100 micrometers. The carbon nanotubes in the carbon nanotube film can be selected from a group consisting of single-walled carbon nanotubes, double-walled carbon nanotubes, and multi-layer carbon nanotubes. Diameters of the single-walled carbon nanotubes approximately range from 0.5 to 50 nanometers. Diameters of the double-walled carbon nanotubes approximately range from 1 to 50 nanometers. Diameters of the multi-walled carbon nanotubes approximately range from 1.5 to 50 nanometers.

It is noted that because the carbon nanotubes in the super-aligned carbon nanotube array have a high purity and a high specific surface area, the carbon nanotube film is adherent in nature. As such, the first carbon nanotube film can be adhered directly to a surface of the substrate 22 without the use of an adhesive. In the alternative, other bonding means can be applied.

The carbon nanotube film, once adhered to a surface of the substrate 22 can be treated with an organic solvent. The carbon nanotube film can be treated by using organic solvent to soak the entire surface of the carbon nanotube film. The organic solvent is volatilizable and can be selected from the group consisting of ethanol, methanol, acetone, dichloroethane, chloroform, and combinations thereof. In the present embodiment, the organic solvent is ethanol. After being soaked by the organic solvent, microscopically, carbon nanotube strings will be formed by adjacent carbon nanotubes in the carbon nanotube film, that are able to do so, bundling together, due to the surface tension of the organic solvent. In one aspect, part of the carbon nanotubes in the untreated carbon nanotube film that are not adhered on the substrate 22 will adhere on the substrate 22 after the organic solvent treatment due to the surface tension of the organic solvent. Then the contacting area of the carbon nanotube film with the substrate 22 will increase, and thus, the carbon nanotube film can more firmly adhere to the surface of the substrate 22. In another aspect, due to the decrease of the specific surface area via bundling, the mechanical strength and toughness of the carbon nanotube film are increased. Macroscopically, the film will be an approximately uniform carbon nanotube film.

Unlike previous methods for making an ITO film, the present method does not require a vacuum environment and heat processing, due to the carbon nanotube film being obtained by being pulled out from an array of carbon nanotubes. Thus, the carbon nanotube layer formed of the at least one carbon nanotube film and used as the transparent conductive layer 24 has the advantage of being low cost, environmentally safe, and energy efficient.

It is to be noted that the shape of the substrate 22 and the transparent conductive layer 24 is chosen according to the requirements of the touch field of the touch panel 20. Generally, the shape of the touch field may, rather advantageously, be triangular or rectangular. In the present embodiment, the shapes of the touch field, the substrate, and the transparent conductive layer 24 are all rectangular.

Due to the transparent conductive layer 24 being rectangular, four electrodes 28 are needed and are formed on the surface thereof, thereby obtaining an equipotential surface. Specifically, the substrate 22 is a glass substrate. The electrodes 28 are strip-shaped and formed of silver, copper, or an alloy of at least one of such metals. The electrodes 28 are located directly on a surface of the transparent conductive layer 24 that faces away from the substrate 22. The electrodes 28 are formed by one or more of spraying, electrical deposition, and electroless deposition methods. Moreover, the electrodes 28 can also be adhered to the surface of the transparent conductive layer 24, e.g., by a silver-based slurry.

Further, in order to prolong operational life span and restrict coupling capacitance of the touch panel 20, the transparent protective layer 26 is located on the electrodes 28 and the transparent conductive layer 24. The material of the transparent protective layer 26 can, e.g., be selected from a group consisting of silicon nitride, silicon dioxide, benzocyclobutenes, polyester film, and polyethylene terephthalate. The transparent protective layer 26 can be a slick plastic film and receive a surface hardening treatment to protect the electrodes 28 and the transparent conductive layer 24 from being scratched when in use.

In the present embodiment, the transparent protective layer 26 is silicon dioxide. The hardness and thickness of the transparent protective layer 26 are selected according to practical needs. The transparent protective layer 26 is adhered to the transparent conductive layer 24, e.g., via an adhesive.

The touch panel 20 can further include a shielding layer 25 located on the second surface 222 of the substrate 22. The material of the shielding layer can be indium tin oxide, antimony tin oxide, carbon nanotube film, and/or another conductive material. In the present embodiment, the shielding layer 25 is a carbon nanotube film. The carbon nanotube film includes a plurality of carbon nanotubes, and the orientation of the carbon nanotubes therein may be arbitrarily determined. The carbon nanotubes in the carbon nanotube film are arranged along a same direction. The carbon nanotube film is connected to ground and acts as a shield, thus enabling the touch panel 20 to operate without interference (such as electromagnetic interference).

Figure 5:
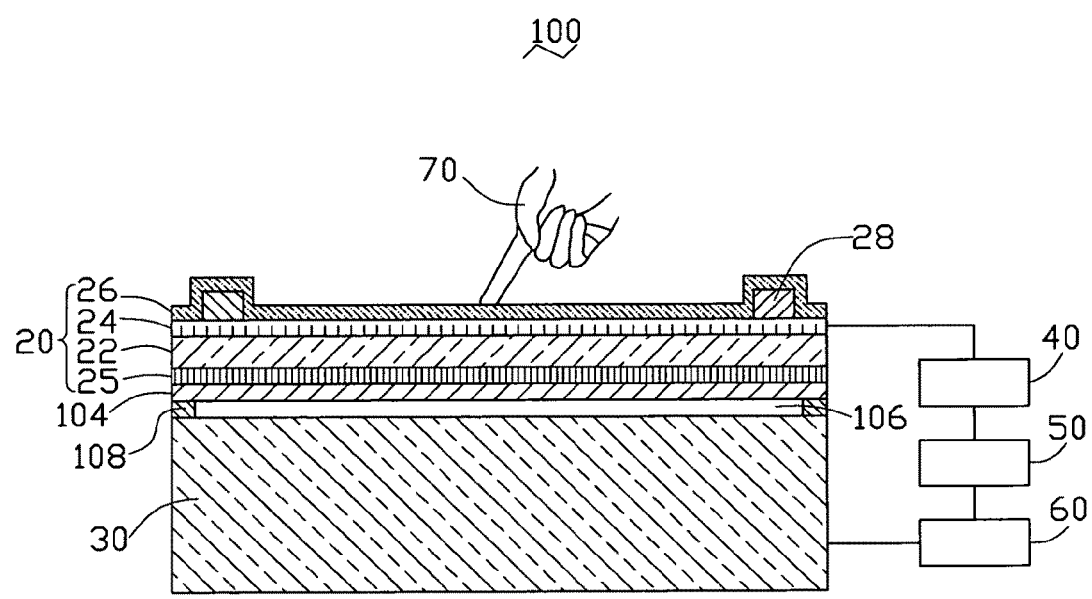
FIG. 5 is essentially a schematic cross-sectional view of the touch panel of the present embodiment used with a display element of a display device, showing operation of the touch panel with a touch tool.

Referring to FIG. 5, a display device 100 includes the touch panel 20, a display element 30, a touch panel controller 40, a central processing unit (CPU) 50, and a display element controller 60. The touch panel 20 is connected to the touch panel controller 40 by an external circuit. The touch panel 20 can be spaced at a distance from the display element 30 or, alternatively, can be installed directly on the display element 30. The touch panel controller 40, the CPU 50, and the display element controller 60 are electrically connected. The CPU 50 is connected to the display element controller 60 to control the display element 30.

The display element 30 can, e.g., be a liquid crystal display, field emission display, plasma display, electroluminescent display, vacuum fluorescent display, cathode ray tube, or other display device.

When the shielding layer 25 is located on the second surface 222 of the substrate 22, a passivation layer 104 is located on and in contact with a surface of the shielding layer 25 that faces away from the substrate 22. The material of the passivation layer 104 can be silicon nitride or silicon dioxide. The passivation layer 104 can be spaced from the display element 30 with a certain distance or, can be directly installed on the display element 30. When the passivation layer 104 is spaced from the display element 30 with a distance, two or more spacers 108 can be used. Thereby, a gap 106 is provided between the passivation layer 104 and the display element 30. The passivation layer 24 can protect the shielding layer 22 from chemical or mechanical damage.

In operation, voltages are applied to the electrodes 28, respectively. A user operates the display device 100 by pressing or touching the transparent protective layer 26 of the touch panel 20 with a touch tool, such as a finger or an electrical pen/stylus 70, while visually observing the display element 30 through the touch panel 20. In the illustration, the touch tool is the user's finger 70. Due to an electrical field of the user, a coupling capacitance forms between the user and the transparent conductive layer 24. For high frequency electrical current, the coupling capacitance is a conductor, and thus the touch tool 70 takes away a little current from the touch point. Currents flowing through the four electrodes 28 cooperatively replace the current lost at the touch point. The quantity of current supplied by each electrode 28 is directly proportional to the distance from the touch point to the electrode 28. The touch panel controller 40 is used to calculate the proportion of the four supplied currents, thereby detecting coordinates of the touch point on the touch panel 20. Then, the touch panel controller 40 sends the coordinates of the touch point to the CPU 50. The CPU 50 receives and processes the coordinates into a command. Finally, the CPU 50 sends out the command to the display element controller 60. The display element controller 60 controls the display of the display element 30 accordingly.

The carbon nanotube layer provided in the present embodiment has superior properties, such as excellent toughness, high mechanical strength, and uniform conductivity. Thus, the touch panel 20 and the display device 100 using the same are durable and highly conductive. Further, the pulling method for fabricating the carbon nanotube layer is simple, and the adhesive carbon nanotube layer can be directly located on the substrate 22. As such, the method for fabricating the carbon nanotube layer is suitable for the mass production of touch panels and display devices using the same, and reduces the costs thereof. Further, the carbon nanotube layer has high transparency for improving the brightness of the touch panel and the display device using the same.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A touch panel comprising:
a substrate comprising a first surface and a second surface opposite to the first surface;
a transparent conductive layer located on the substrate, the transparent conductive layer comprising a carbon nanotube layer, the carbon nanotube layer comprising a plurality of carbon nanotubes, a majority of carbon nanotubes in the carbon nanotube layer are arranged along a same direction; and
four electrodes being electrically connected with the transparent conductive layer and located on a surface of the transparent conductive layer,
wherein the carbon nanotube layer comprises a carbon nanotube film, and the carbon nanotube film comprises a plurality of successively oriented carbon nanotube segments joined end to end by the van der Waals attractive force therebetween, and each carbon nanotube segment comprising the plurality of carbon nanotubes that are combined by van der Waals attractive force therebetween.

2. The touch panel as claimed in claim 1, wherein a thickness of the carbon nanotube film approximately ranges from 0.5 nanometers to 100 micrometers.

3. The touch panel as claimed in claim 1, wherein the carbon nanotubes in the carbon nanotube layer can be selected from the group consisting of single-walled carbon nanotubes, double-walled carbon nanotubes, and multi-walled carbon nanotubes.

4. The touch panel as claimed in claim 1, wherein the electrodes are located on a surface of the transparent conductive layer.

5. The touch panel as claimed in claim 4, wherein the electrodes are adhered to the surface of the transparent conductive layer using a silver-based slurry, the electrodes being metal electrodes.

6. The touch panel as claimed in claim 1, further comprising a transparent protective layer located on a surface of the transparent conductive layer.

7. The touch panel as claimed in claim 6, wherein the material of the transparent protective layer is selected from a group consisting of silicon nitride, silicon dioxide, benzocyclobutenes, polyester film, and polyethylene terephthalate.

8. The touch panel as claimed in claim 1, further comprising a shielding layer located on the second surface of the substrate.

9. The touch panel as claimed in claim 8, wherein the shielding layer is a carbon nanotube film comprising a plurality of carbon nanotubes arranged along a same direction.

10. A display device comprising:
a touch panel comprising:
a substrate;
a transparent conductive layer located on the substrate, the transparent conductive layer comprising a carbon nanotube layer, the carbon nanotube layer consisting of a plurality of carbon nanotubes arranged along a same direction; and
four electrodes directly and electrically connected with the transparent conductive layer; and
a display element positioned opposite and adjacent to the touch panel.

11. The display device as claimed in claim 10, further comprising a touch panel controller, a central processing unit, and a display element controller electrically connected to each other, the touch panel controller being connected to the touch panel, and the display element controller being connected to the display element.

12. The display device as claimed in claim 10, wherein the touch panel is spaced from the display element with a distance.

13. The display device as claimed in claim 10, wherein the touch panel is located on the display element.

14. The display device as claimed in claim 10, further comprising a passivation layer located on the touch panel and the passivation layer being comprised of one of silicon nitrides and silicon dioxides.

15. The touch panel as claimed in claim 1, wherein the carbon nanotube layer comprises a plurality of coplanar carbon nanotube films.

16. The touch panel as claimed in claim 1, wherein the transparent conductive layer consists of the carbon nanotube layer, the carbon nanotube layer consists of the plurality of carbon nanotubes.

17. A touch panel comprising:
a substrate;
a transparent conductive layer located on the substrate, the transparent conductive layer consisting of a carbon nanotube layer, the carbon nanotube layer consisting of a plurality of carbon nanotubes arranged along a same direction; and
four electrodes being electrically connected with the transparent conductive layer.

* * * * *